United States Patent
Bolinth et al.

(10) Patent No.: US 7,421,030 B2
(45) Date of Patent: Sep. 2, 2008

(54) METHOD AND DEVICE FOR TRANSFERRING DATA IN A MULTI-CARRIER SYSTEM HAVING PARALLEL CONCATENATED ENCODING AND MODULATION

(75) Inventors: Edgar Bolinth, Mönchengladbach (DE); Kalyan Koora, Bocholt (DE); Giancarlo Lombardi, Den Haag (DE)

(73) Assignee: Siemens Aktiengesellschaft, Munich (DE)

( * ) Notice: Subject to any disclaimer, the term of this patent is extended or adjusted under 35 U.S.C. 154(b) by 753 days.

(21) Appl. No.: 10/477,291

(22) PCT Filed: May 8, 2001

(86) PCT No.: PCT/DE01/01741

§ 371 (c)(1),
(2), (4) Date: Oct. 4, 2004

(87) PCT Pub. No.: WO02/091653

PCT Pub. Date: Nov. 14, 2002

(65) Prior Publication Data

US 2005/0047514 A1 Mar. 3, 2005

(51) Int. Cl.
*H04K 1/10* (2006.01)
*H04L 27/28* (2006.01)

(52) U.S. Cl. .................. 375/260; 375/265; 375/299; 375/347; 375/346; 375/349

(58) Field of Classification Search ............ 375/242, 375/259, 260, 261, 262, 264, 265, 295, 298, 375/302, 316, 322, 324, 329, 299, 347, 346, 375/349; 370/203, 206, 211

See application file for complete search history.

(56) References Cited

U.S. PATENT DOCUMENTS

| | | | | |
|---|---|---|---|---|
| 4,980,897 A * | 12/1990 | Decker et al. | | 375/265 |
| 5,903,546 A * | 5/1999 | Ikeda et al. | | 370/232 |
| 6,088,387 A | 7/2000 | Gelblum et al. | | |
| 6,452,981 B1 * | 9/2002 | Raleigh et al. | | 375/299 |
| 6,598,203 B1 * | 7/2003 | Tang | | 714/790 |
| 6,654,921 B1 * | 11/2003 | Jones et al. | | 714/746 |
| 6,731,668 B2 * | 5/2004 | Ketchum | | 375/130 |
| 7,031,397 B1 * | 4/2006 | O'Neill | | 375/265 |
| 7,106,802 B1 * | 9/2006 | Heiskala et al. | | 375/265 |

FOREIGN PATENT DOCUMENTS

| | | |
|---|---|---|
| EP | 0 980 148 | 2/2000 |
| EP | 0 991 221 | 4/2000 |
| EP | 1 052 153 | 8/2000 |

\* cited by examiner

*Primary Examiner*—Phuong Phu

(57) ABSTRACT

The invention relates to a transmitter-receiver pair for improved data transmission in a multi-carrier system and to a corresponding method, according to which a chain coding is used. To this end, a transmitter has a first coding stage, a transmission-demultiplexer stage, a second coding stage, a modulator stage, a transmission-multiplexer stage and a multi-carrier modulator, whereby said transmission-demultiplexer stage and the transmission-multiplexer stage are controlled by a bit loading device. Similarly, the receiver has a multi-carrier demodulator, a receiver demultiplexer stage, a first decoding stage, a receiver multiplexer stage and a second decoding stage, whereby the receiver-multiplexer stage and demultiplexer stage are in turn controlled by the bit loading device.

25 Claims, 3 Drawing Sheets

METHOD AND DEVICE FOR TRANSFERRING DATA IN A MULTI-CARRIER SYSTEM HAVING PARALLEL CONCATENATED ENCODING AND MODULATION

BACKGROUND OF THE INVENTION

The present invention relates to a transmit and receive device for improved data transfer in a multi-carrier system, together with an associated method, and, in particular, to a transmit and receive device together with an associated method for improved data transfer in a wireless OFDM-based multi-carrier system having channels which exhibit a quasi-static behavior.

Conventional digital multi-carrier systems transmit and receive digital signals using a multiplicity of carriers or subchannels having various frequencies. In this context, a transmitter divides a transmit signal into a multiplicity of components, assigns the components to a specific carrier, encodes each carrier in accordance with its components, and transfers each carrier via one or more transfer channels.

A device and a method for improved data transfer in an OFDM multi-carrier system, in which an adaptive modulation is combined with a multilevel encoding, is disclosed on pages 21.1-21.5 of the document reference "Combining Multilevel Coding and Adaptive Modulation in OFDM Systems" by M. Lampe and H. Rohling, $1^{st}$ OFDM Workshop, Sep. 21-22, 1999, Hamburg-Harburg, Germany.

In this context, the multilevel encoder includes a demultiplexer for dividing a serial data stream into a multiplicity of parallel data streams, a multiplicity of parallel-arranged encoders and post-connected QAM modulators, and a multiplexer for returning data in a serial data stream. The decoder includes a multiplicity of decoders and demodulators which are arranged in parallel, and a multiplexer for returning the parallel data stream in a serial data stream. By combining this multilevel encoding with the adaptive modulation, it is possible to derive a multi-carrier system with improved data transfer properties and reduced susceptibility to failure.

In accordance with the aforementioned document reference, therefore, a data grouping is partitioned and the so-called "weakest" and "strongest" bits are examined with regard to their error susceptibility, wherein on the basis of the observed properties a more or less strong error correction is applied; for example, in the form of FEC encoding procedures (Forward Error Correction). In order to reduce system complexity, the output signal of a relevant demodulator/decoding level is forwarded to the higher-order demodulator/decoder in the multilevel structure of the decoder. The encoders are the same at each level, and are merely punctured differently.

A method and an arrangement for transferring data are disclosed in EP 0 991 221 A2, in which interference characteristics are specified for a selection of n channels to be used for an audio data transfer. For this, data bits of the audio data are divided into n classes on the basis of their sensitivity to errors which occur, the division being performed in such a way that the classes of bits with the highest error sensitivity are transferred on channels which are the least susceptible to interferences.

In contrast, the present invention addresses the problem of creating a transmit and receive device for improved data transfer in a multi-carrier system, together with an associated method.

SUMMARY OF THE INVENTION

In accordance with the present invention a transmit device which has further improved data transfer properties and is particularly suitable for channels having a quasi-static behavior is produced, in particular, by using a first encoding level, a transmit demultiplexer level, a second encoding level for performing a second encoding, a modulator level for performing a QAM modulation, a transmit multiplexer level, a multi-carrier modulator and a bit-loading device for performing a bit-loading algorithm and for controlling the transmit demultiplexer level and transmit multiplexer level.

In particular, a receive device features a multi-carrier demodulator, a receive demultiplexer level, a first decoding level for performing a first decoding, a demodulator level for performing a QAM demodulation, a receive multiplexer level, a second decoding level and a bit-loading device for performing a bit-loading algorithm for controlling the receive demultiplexer level and the receive multiplexer level, whereby a more stable transfer or reduced failure susceptibility can be achieved on the receive side, particularly when transferring data on channels having quasi-static behavior.

The transmit and receive devices optionally may feature an interleaver or de-interleaver in their first encoding level or decoding level, respectively, for performing or reversing interleaving, whereby the data transfer properties can be further improved.

Furthermore, the first encoding level or decoding level may feature a puncturer or de-puncturer, respectively, for performing puncturing or de-puncturing depending on the bit-loading algorithm which is performed, thereby producing a more reliable transfer for the data values on either side of the punctured data value.

The multi-carrier modulator or demodulator of the transmit and receive device, respectively, preferably performs an OFDM, MC-CDMA and/or CDMA modulation or demodulation (Orthogonal Frequency Division Multiplexing, Multi-Carrier Code Division Multiple Access, Code Division Multiple Access), whereby particularly stable data transfer conditions can be achieved when high interference levels are present.

The modulator or demodulator level of the transmit and receive device, respectively, preferably includes a multiplicity of QAM modulators or demodulators with which different modulation or demodulation procedures can be performed. In this way, it is possible to adapt very precisely to the relevant transfer conditions or channel properties.

In order to further improve the data transfer properties, the receive device can include a transmitter chain in a feedback path, the transmitter chain providing for the feeding back of output signals of the second decoding level, which preferably performs a Viterbi algorithm, wherein the transmitter chain reproduces the function blocks which are used in a transmit path. In this context, a resulting reproduced serial sequence of QAM symbols is analyzed, together with a received serial sequence of QAM symbols which was generated by the multi-carrier demodulator, in an analysis unit for generating a reliability information signal, and then forwarded to a selection device for selecting a relevant reliability information signal of a $1^{st}$ to $k^{th}$ iteration, which signal subsequently affects the first decoding level.

However, as an alternative to the feedback described in the previous paragraph, it is also possible in the second decoding level to perform a so-called Soft-Output Viterbi Algorithm (SOVA) for outputting an additionally calculated reliability information signal, the signal then being forwarded in a selection device to the demultiplexer level and the first decoding level. If puncturing or interleaving is used, this feedback path also may include a puncture and an interleaver, again resulting in improved transfer properties.

Additional features and advantages of the present invention are described in, and will be apparent from, the following Detailed Description of the Invention and the Figures.

DETAILED DESCRIPTION OF THE INVENTION

Figure 1:
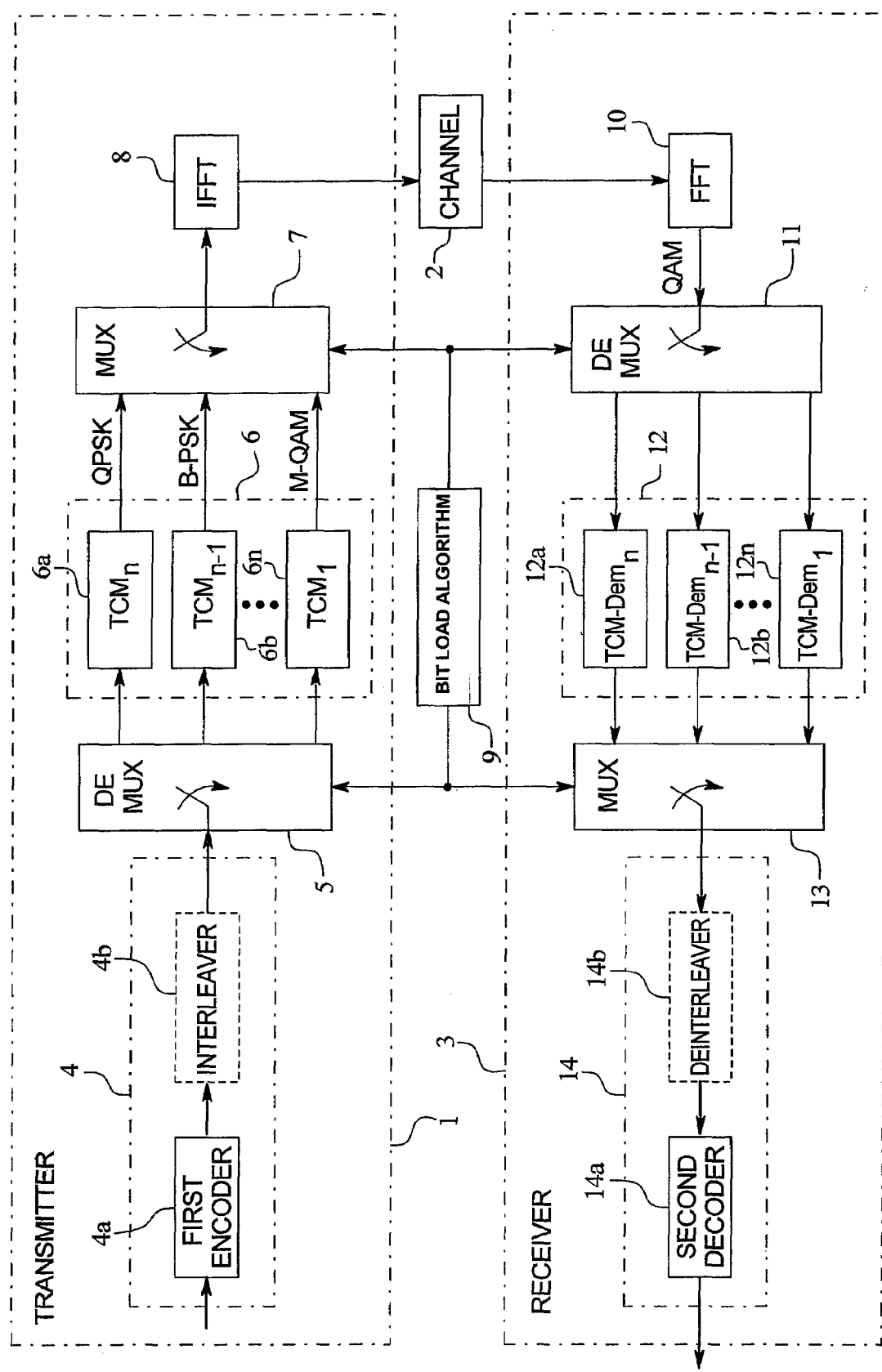
FIG. 1 shows a simplified block diagram of a transmit and receive device for improved data transfer in a multi-carrier system in accordance with a first exemplary embodiment of the present invention.

FIG. 1 shows a simplified block diagram of a transmit and receive device for improved data transfer in a wireless multi-carrier system, wherein a so-called OFDM modulation (Orthogonal Frequency Division Multiplexing) is used as a multiplexing or multi-carrier modulation method. As an alternative, however, the MC-CDMA (Multi-Carrier Code Division Multiple Access) or CDMA (Code Division Multiple Access) method can be used.

In particular, such modulation methods are particularly suitable for heavily interfered terrestrial transfers of digital broadcasting signals, since these are not sensitive to channel echoes.

The present invention is not restricted to wireless multi-carrier systems, however, and includes wire-based multi-carrier systems such as Powerline. (PLC), etc.

The present invention relates, in particular, to a multi-carrier system in accordance with the HiperLAN standard (HiperLAN/2 standard). This standard can be used just as well for extending an existing wire-based LAN (Local Area Network) as for transferring between individual computers.

In accordance with FIG. 1, the reference numeral 1 designates a transmitter for transmitting digital data via a channel 2 to a receiver 3. The channel 2 provides, for example, a frequency range according to the HiperLAN/2 standard, wherein a wireless transfer medium is used. As suggested above, the present invention can, nonetheless, be applied to wire-based or line-based multi-carrier systems, which are also known as xDSL (Digital Subscriber Line), for example. An a/b line is used as a transfer medium in this type of configuration.

In accordance with FIG. 1, a serial data stream which has to be transferred is initially supplied to a first encoding level 4 having an encoder 4a for performing a first encoding. A so-called interleaver 4b optionally can be post-connected to this encoder 4a. In this type of configuration, the interleaver collects data blocks which are to be transmitted, in order then to interleave them with each other to form new data blocks. These interleaved data block groups are subsequently supplied to a transmit demultiplexer level 5, so that the serial data stream can be divided into a multiplicity of parallel data streams. In this way, particularly in the case of block data transfer (data burst), it is possible to "break up" serious line group errors into a multiplicity of small isolated errors which consequently have no further effect; for example, in the case of voice data. It is, therefore, possible for known channel encoding methods such as FEC (Forward Error Correction) to be used again, whereby a data transfer is improved.

In accordance with FIG. 1, the data stream which is divided up by the transmit demultiplexer level is supplied to a TCM encoding level 6 for performing an encoding and a post-connected modulation for a multiplicity of parallel data streams (e.g., trellis-coded modulations). More precisely, the second TCM encoding level 6 includes a multiplicity of TCM (Trellis-Coded Modulation) modulators $6a$ to $6n$ for performing a multiplicity of different modulation procedures (e.g., QPSK, 8-PSK to M-QAM), which are applied to the multiplicity of parallel data streams. The trellis-coded modulation provides a sophisticated modulation method having integrated error correction, combining a digital modulation with a channel encoding. Because the modulation signals (QAM, Quadrature Amplitude Modulation) in the state space are very close to each other in the case of high-quality digital modulation methods, the process of decoding is difficult. At this stage, the trellis-coded modulation ensures that two similar code words are shown on states in the state space, characterized by amplitude and phase, which are not immediately adjacent to each other, thereby making it possible to decode the digital signals even if the signals are very noisy. In principle, however, this TCM encoding level also may include a second encoding level for performing a second encoding and a modulator level for performing a QAM modulation, wherein the number of parallel data streams which are processed in each case can vary.

The parallel data streams encoded in the TCM encoding level 6 are subsequently supplied to a transmit multiplexer level 7 for rearranging into a serial sequence of QAM symbols and supplied to a multi-carrier modulator 8 for performing a copying and pulse shaping on a multi-carrier time signal. The multi-carrier modulator 8 performs in Inverse Fast Fourier Transformation (IFFT), for example, and is preferably an OFDM modulator for implementing an OFDM modulation (Orthogonal Frequency Division Multiplexing). These signals are subsequently forwarded to the receiver 3 via a channel 2 of a wireless or wire-based transfer interface.

In order to create an adaptive multi-carrier system, both the transmitter 1 and the receiver 3 have associated functional units of a bit-loading device 9, the device being shown only once as an integral unit in FIG. 1 since it must be synchronized via a signaling channel in any case. The bit-loading device basically performs a bit-loading algorithm whereby, depending on current channel properties, it is possible to control an optimum distribution or an optimum selection of relevant coding methods, modulation methods and/or a selection of the bits to be transferred.

In accordance with FIG. 1, the bit-loading device 9 basically controls a so-called bit-loading in the transmit demultiplexer level 5 and in the transmit multiplexer level 7, wherein the loaded bits are supplied to the different TCM modulators (Trellis-Coded Modulation) via the different parallel data streams, and subsequently fed back into a serial data stream again. In particular, using different modulation procedures, it is possible to select suitable modulation or coding methods depending on a signal-to-noise ratio (SNR) on channel 2, thereby providing a multi-carrier system with improved data transfer properties.

On the receiver side, the transferred multi-carrier time signal from a multi-carrier demodulator 10 is returned in a serial sequence of QAM symbols QAM and supplied to a receive demultiplexer level 11, wherein a Fast Fourier Transformation (FFT), for example, is used. The serial sequence of QAM signals QAM preferably represents a so-called quadrature-amplitude-modulated signal sequence, which is particularly suitable for the transfer of high data speeds and also combines the properties of the so-called ASK (Amplitude Shift Keying) and PSK (Phase Shift Keying). More precisely stated, the carrier in this context is modulated in amplitude and phase, wherein a multiplicity of variants is possible (QPSK, 8-PSK, 16-QAM, 32-QAM, 64-QAM, . . . M-QAM). Such modulation signals and associated modulation methods are specified in greater detail in the HiperLAN/2 standard, for example.

In the receive demultiplexer level 11, the serial sequences of QAM symbols (QAM) are divided into a multiplicity of parallel sequences of QAM symbols and supplied to a TCM decoding level 12 for performing a multiplicity of demodulations and subsequent decodings (trellis-coded demodulations). In this context, the encoding performed in the TCM encoding level 6 is essentially undone again, wherein a multiplicity of TCM demodulators 12a to 12n (Trellis Code Demodulation) preferably are present for performing a multiplicity of different demodulation procedures. In principle, however, this TCM decoding level also may include a demodulator level for performing a multiplicity of QAM demodulations on the parallel sequences of QAM symbols and a first decoding level for performing a first decoding of the demodulated parallel data streams, producing a parallel data stream, wherein a number of the parallel data streams which are processed in each case can vary.

The receive demultiplexer level 11 is again controlled by the bit-load device or its associated bit-load algorithm in such a way that an optimum regeneration of the transferred data signals occurs.

In order to return the parallel data streams in a serial data stream, a receive multiplexer level 13 is again controlled by the bit-load device 9 in such a way that the relevant data is rearranged into a correct sequence.

Finally, this serial data stream is again supplied to a second decoding level 14 for performing a second decoding, which basically corresponds to the first encoding of the transmitter 1 or encoder 4a. This second decoding is performed by a decoder 14a, wherein a de-interleaver 14b optionally may be included to improve error susceptibility again, the de-interleaver essentially reversing the interleaving performed by an interleaver 4b which is optionally present in the transmitter 1.

Figure 2:
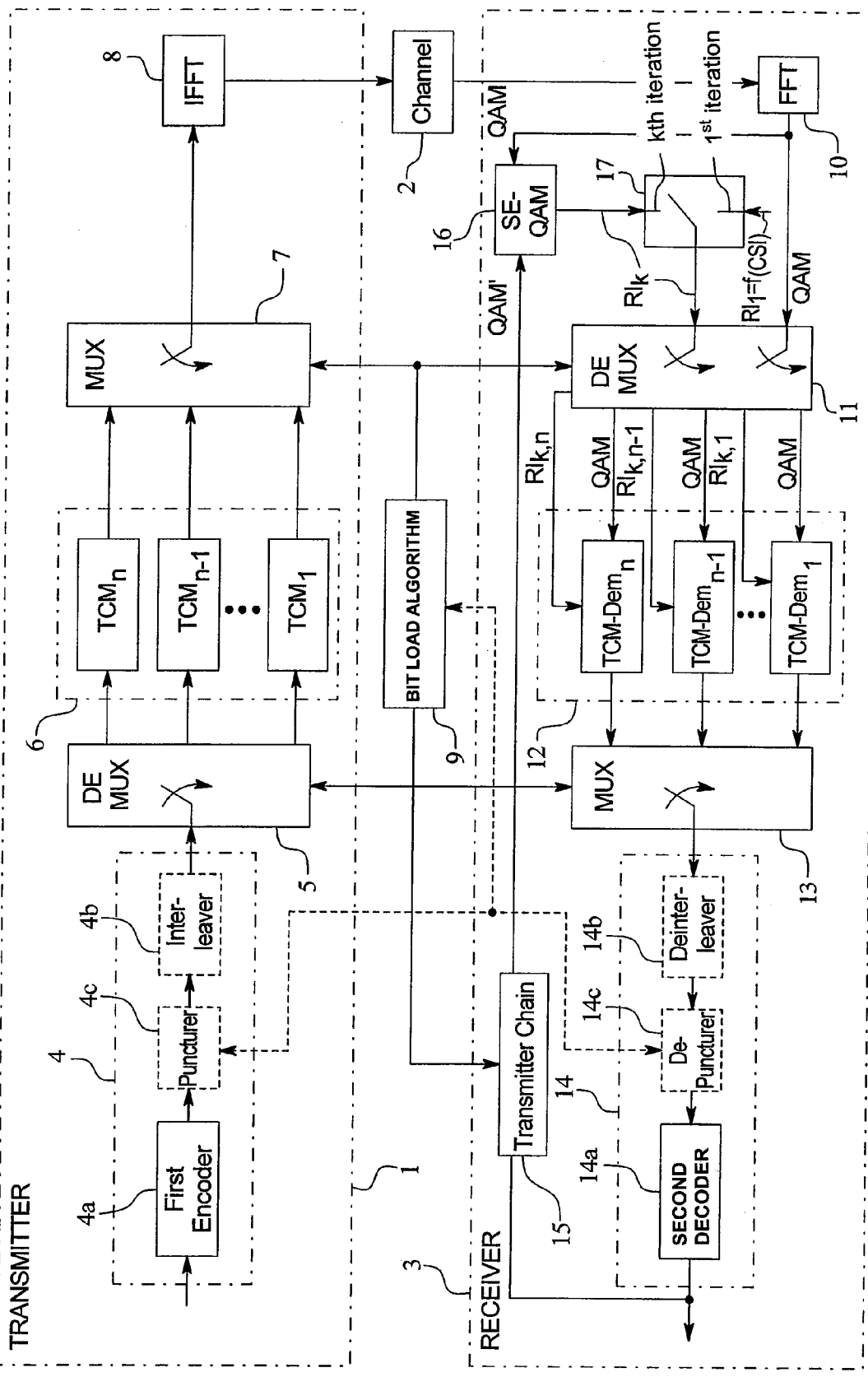
FIG. 2 shows a transmit and receive device for improved data transfer in a multi-carrier system in accordance with a second exemplary embodiment of the present invention.

FIG. 2 shows a simplified block diagram of a transmit and receive device for improved data transfer in a multi-carrier system in accordance with a second exemplary embodiment, wherein identical reference numerals designate identical or similar elements to those in FIG. 1 and a duplicate description has not been repeated in the following.

In accordance with FIG. 2, the transmit device or transmitter 1 optionally also may include in its first encoding level a puncture 4c to perform puncturing (e.g., data speed adaptation), of the encoded serial data stream depending on the bit-load algorithm performed by the bit-load device 9. Using such a puncture 4c, data can be deleted from the encoded data stream at specific points, wherein more reliable or more stable transfer mechanisms are used for the data values in the immediate vicinity of or adjacent to the punctured data value. In this way, a data stream which has to be transferred again can be reduced or adapted without substantially affecting the data transfer properties.

On the receiver side, the second decoding level 14 likewise may include a so-called de-puncturer 14c, which performs a de-puncturing of the serial input data stream depending on the bit-load algorithm which has been performed, thereby reversing the puncturing performed in the transmitter 1.

In accordance with FIG. 2, however, the receiver 3 also may include a feedback path having a transmitter chain 15, an analysis unit 16 and a selection device 17.

As in the first exemplary embodiment, a so-called Viterbi algorithm is preferably performed in the second decoder 14a, the Viterbi algorithm being used in particular in digital cellular mobile radio interfaces. This channel encoding and decoding method is particularly advantageous due to its data regeneration capabilities. In accordance with FIG. 2, the data signals (hard decision bits) output by the second decoder 14a are consequently supplied to the transmitter chain 15, which essentially corresponds to a transmit path of the associated transmitter 1; i.e., the blocks 4, 5, 6 and 7.

In this way, a reproduced serial sequence of QAM symbols QAM' is obtained in the feedback path, the sequence being analyzed by the analysis unit 16, in conjunction with a received serial sequence of QAM symbols QAM which is output by the demodulator 10, and used to generate a reliability information signal RIk. In this context, for example, a multiplicity of iterations are performed on the sequences of QAM symbols, and supplied from the selection device 17 to the receive demultiplexer level 11 and via this, in turn, to the multiplicity of TCM demodulators.

It should be noted here that, in the case of the first iteration when no feedback series of QAM symbols is yet present, a reliability information signal RI1 as a function of a channel state information CSI is used for calculating a metric value. In this case, the channel state information CSI is derived from a channel estimation, which is normally based on the signal-to-noise ratio (SNR) of a relevant channel or sub-carrier and also may be used for the bit-load device 9. A further improvement in the data transfer properties can be achieved in this way without significantly increasing the effort in the receiver 3.

Figure 3:
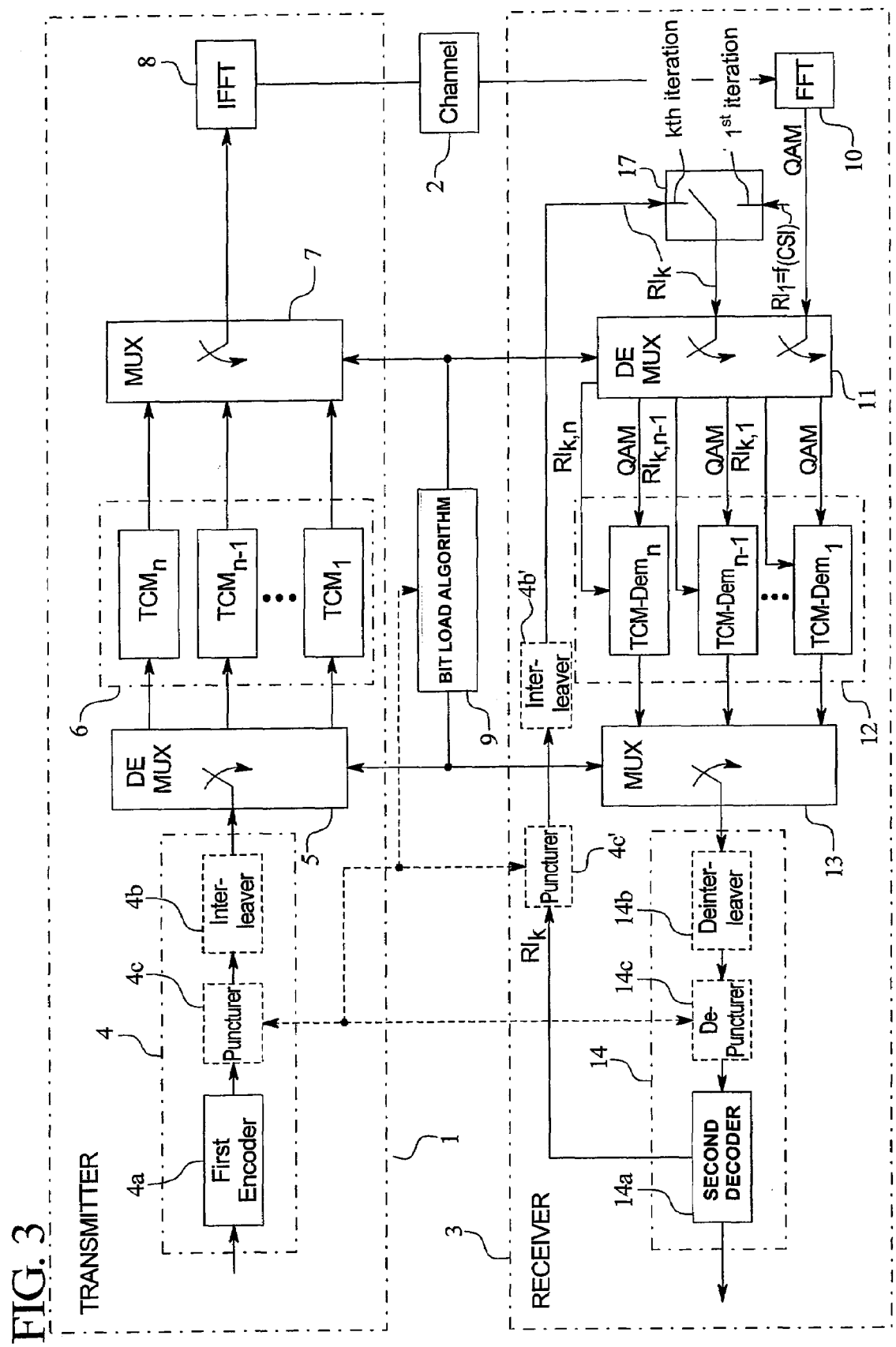
FIG. 3 shows a transmit and receive device for improved data transfer in a multi-carrier system in accordance with a third exemplary embodiment of the present invention.

FIG. 3 shows a simplified block diagram of a transmit and receive device for improved data transfer in a multi-carrier system in accordance with a third exemplary embodiment, wherein identical reference numerals designate identical or similar elements to those in FIGS. 1 and 2 and a duplicate description has not been repeated in the following.

The exemplary embodiment in accordance with FIG. 3 differs from the exemplary embodiment in accordance with FIG. 2 in that a special second decoder 14a' is now used instead of the second decoder 14a. More precisely stated, the second decoder 14a' in accordance with FIG. 3 performs a so-called Soft-Output Viterbi Algorithm (SOVA) in which calculated reliability information signals $RI_k'$ (soft decision bits) are output in addition to the previously described output data (hard decision bits). These calculated reliability information signals, which again reflect reliability information for a relevant channel 2 or sub-carrier as in the previous example and can show, e.g., a log-MAP value or log-likelihood metric value, are again supplied to the select device 17 for selection of a reliability information signal of the $1^{st}$ to $k^{th}$ iteration and copied to parallel sequences of reliability information signals $RI_1$ in a suitable manner via the receive demultiplexer level 11 for controlling the TCM decoding level 12, wherein the reliability information signal $RI_1$ of a first iteration is again a function of a channel state information CSI and is essentially derived from a channel estimation.

These reliability information signals $RI_k$ are again supplied to the receive demultiplexer level 11 and to the QAM demodulators of the TCM decoding level 12, wherein an optimized or adapted TCM demodulation/decoding takes place depending on the bit-load algorithm of the bit-load device 9.

In accordance with FIG. 3, a puncture 4c' and an interleaver 4b' again may be inserted in the feedback path as an option, provided such a puncture 4c and/or interleaver 4b is present on the transmitter side.

As a result of using the second decoder 14a' including a Soft-Output Viterbi Algorithm (SOVA) for creating calculated reliability information signals $RI_k'$, a transmitter chain 15 can be at least partly omitted, whereby the effort can be further reduced, in particular, for the receiver 3.

As a result of the special linking of the first encoding level and the second encoding level, which linking furthermore allows an adaptive modulation, it is possible to achieve improved data transfer properties in multi-carrier systems; in particular, for channels with a quasi-static behavior.

The present invention was described above with reference to a multi-carrier system based on the HiperLAN/2 standard. However, it is not restricted to this and likewise includes wireless and wire-based multi-carrier systems with or without OFDM modulation.

Indeed, although the present invention has been described with reference to specific embodiments, those of skill in the art will recognize that changes may be made thereto without departing from the spirit and scope of the present invention as set forth in the hereafter appended claims.

The invention claimed is:

1. A transmit device for data transfer in a multi-carrier system, comprising:
   a first encoding level for performing a first encoding on a serial data stream;
   a transmit demultiplexer level for dividing the encoded serial data stream into a plurality of parallel data streams;
   a second encoding level for performing a second encoding for the plurality of parallel data streams, resulting in a plurality of encoded parallel data streams;
   a modulator level for performing a QAM modulation for the plurality of encoded parallel data streams, resulting in a plurality of modulated parallel data streams;
   a transmit multiplexer level for rearranging the modulated parallel data streams into a serial data stream;
   a multi-carrier modulator for performing a pulse shaping and a copying of QAM symbols onto a multi-carrier time signal; and
   a bit-load device for performing a bit-load algorithm and for controlling both the transmit demultiplexer level and the transmit multiplexer level;
   wherein the second encoding level has a first plurality of encoders, the modulator level has a second plurality of TCM modulators for performing a plurality of different modulation procedures, and the first encoding level has a puncturer for performing a data speed adaptation of the encoded serial data stream depending on the bit-load algorithm performed.

2. A transmit device for data transfer in a multi-carrier system as claimed in claim 1, wherein the first encoding level includes an interleaver for performing an interleaving of the serial data stream.

3. A transmit device for data transfer in a multi-carrier system as claimed in claim 1, wherein the multi-carrier modulator performs at least one of an OFDM, an MC-CDMA and a CDMA modulation.

4. A receive device for data transfer in a multi-carrier system comprising:
   a multi-carrier demodulator for returning a transfer multi-carrier time signal in a serial sequence of QAM symbols;
   a received demultiplexer level for dividing the serial sequence of QAM symbols into a plurality of parallel sequences of QAM symbols;
   a demodulator level for performing a plurality of QAM demodulations on the parallel sequences of QAM symbols, resulting in a plurality of demodulated parallel data streams;
   a first decoding level for performing a first decoding of the demodulated parallel data streams for generating a parallel data stream;
   a receive multiplexer level for rearranging the parallel data stream into a serial data stream;
   a second decoding level for performing a second decoding of the serial data stream; and
   a bit-load device for performing a bit-load algorithm and for controlling the receive demultiplexer level and the receive multiplexer level;
   wherein the demodulator level has a first plurality of QAM demodulators for performing a plurality of different demodulation procedures, the first decoding level has a second plurality of decoders which are implemented as TCM demodulators, and the second decoding level has a de-puncturer for performing a data speed adaptation of the serial input data stream depending on the bit-load algorithm performed.

5. A receive device for data transfer in a multi-carrier system in claim 4, wherein the second decoding level includes a de-interleaver for reversing an interleaving of the serial input data stream.

6. A receive device for data transfer in a multi-carrier system as claimed in claim 4, wherein the multi-carrier demodulator performs at least one of OFDM, MC-CDMA and CDMA demodulation.

7. A receive device for data transfer in a multi-carrier system as claimed in claim 4, wherein the second decoding level performs a Viterbi algorithm.

8. A receive device for data transfer in a multi-carrier system as claimed in claim 4, further comprising:
   a transmitter chain which is a reproduction of a transmit path and generates a reproduced serial sequence of QAM symbols from the data stream which is generated by the second decoding level;
   an analysis unit for generating a reliability information signal depending on the reproduced serial sequence of QAM symbols and the received serial sequence of QAM symbols of a multi-carrier demodulator; and
   a select device for selecting a reliability information signal of a $1^{st}$ to $k^{th}$ iteration, wherein the reliability information signal of a $1^{st}$ iteration represents a function of a channel state information.

9. A receive device for data transfer in a multi-carrier system as claimed in claim 8, wherein the channel state information is derived from a channel estimation.

10. A receive device for data transfer in a multi-carrier system as claimed in claim 8, wherein the plurality of QAM demodulators and first decoders, which are implemented as TCMD modulators, are controlled depending on the selected reliability information signals.

11. A receive device for data transfer in a multi-carrier system as claimed in claim 4, wherein the second decoding level performs a soft-output Viterbi algorithm for outputting a reproduced reliability information signal.

12. A receive device for data transfer in a multi-carrier system as claimed in claim 11, further comprising:
   a feedback path for feeding back the reproduced reliability information signal; and a select device for selecting a reliability information signal of a $1^{st}$ to $k^{th}$ iteration, wherein the reliability information signal of a $1^{st}$ iteration represents a function of a channel state information.

13. A receive device for data transfer in a multi-carrier system as claimed in claim 12, wherein the channel state information is derived from a channel estimation.

14. A receive device for data transfer in a multi-carrier system as claimed in claim 12, wherein the plurality of post-connected first decoders are controlled depending on the selected reliability information signals.

15. A received device for data transfer in a multi-carrier system as claimed in claim 13, wherein the feedback path includes at least one of a puncturer and an interleaver, which are reproductions of a corresponding element of a transmit path.

16. A method for data transfer in a multi-carrier system, the method comprising the steps of:
   a) performing a first encoding on a serial data stream;
   b) dividing the serial data stream into a plurality of parallel data streams;
   c) performing a plurality of second encodings on the parallel data streams;
   d) performing a plurality of QAM modulations on the encoded parallel data streams;
   e) rearranging the QAM-modulated parallel data streams into a serial sequence of QAM symbols;
   f) performing a multi-carrier modulation;
   g) transferring the modulated data stream on at least one channel of a transfer medium;
   h) performing a multi-carrier demodulation for generating a serial sequence of QAM symbols;
   i) dividing the serial sequence of QAM symbols into a plurality of parallel sequences of QAM symbols;
   j) performing a plurality of QAM demodulations on the parallel sequences of QAM symbols;
   k) performing a plurality of first decoding on the QAM-demodulated parallel data streams;
   l) rearranging the decoded parallel data streams into a serial data stream;
   m) performing a second decoding of the serial data stream; and
   n) performing a bit-load algorithm for controlling the steps b), e), i) and l) wherein a puncturing is performed after step a) and a de-puncturing is performed before step m) depending on the bit-load algorithm which has been performed.

17. A method for data transfer in a multi-carrier system as claimed in claim 16, the method further comprising the steps of:

performing an interleaving of the serial data stream following step a); and
performing a reversal of the interleaving of the serial input data stream following step 1).

18. A method for data transfer in a multi-carrier system as claimed in claim 16, wherein different combinations of at least one second encoding and at least one post-connected QAM modulation are performed in steps c) and d), and
   different combinations of at least one first decoding and at least one pre-connected QAM demodulation are performed in steps j) and k).

19. A method for data transfer in a multi-carrier system as claimed in claim 16, wherein at least one of an OFDM, an MC-CDMA and CDMA modulation is performed in step f), and at least one of an OFDM, MC-CDMA and a CDMA demodulation is performed in step h).

20. A method for data transfer in a multi-carrier system as claimed in claim 16, wherein a Viterbi algorithm is performed in step m).

21. A method for data transfer in a multi-carrier system as claimed in claim 16, wherein step m) further includes feeding back the decoded serial data stream via a transmitter chain for generating a reproduced serial sequence of QAM symbols, generating a reliability information signal depending on the reproduced and the received serial sequence of QAM symbols, and selecting and copying a reliability information signal of a $1^{st}$ to $k^{th}$ iteration for controlling step j), wherein the copied reliability information signal of a $1^{st}$ iteration represents a function of a channel state information.

22. A method for data transfer in a multi-carrier system as claimed in claim 16, wherein a soft-output Viterbi algorithm for outputting a calculated reliability information signal is performed in step m).

23. A method for data transfer in a multi-carrier system as claimed in claim 21, wherein step m) further includes linking the calculated reliability information signal back into a feedback path, and selecting and copying a reliability information signal of a $1^{st}$ to $k^{th}$ iteration for controlling step i), wherein the copied reliability information signal of the $1^{st}$ iteration represents a function of a channel state information.

24. A method for data transfer in a multi-carrier system as claimed in claim 21, wherein the channel state information is derived from a channel estimation.

25. A method for data transfer in a multi-carrier system as claimed in claim 23, the method further comprising the step of performing at least one of a puncturing and an interleaving in the feedback path as in the transmit path.

\* \* \* \* \*